(12) United States Patent
Estabrook (10) Patent No.: US 11,586,205 B2
(45) Date of Patent: *Feb. 21, 2023

(54) AUTOPILOT FEATURES FOR MARINE NAVIGATION

(71) Applicant: Garmin Switzerland GmbH, Schaffhausen (CH)

(72) Inventor: John T. Estabrook, Corvallis, OR (US)

(73) Assignee: Garmin Switzerland GmbH

( * ) Notice: Subject to any disclaimer, the term of this patent is extended or adjusted under 35 U.S.C. 154(b) by 999 days.

This patent is subject to a terminal disclaimer.

(21) Appl. No.: 16/297,295

(22) Filed: Mar. 8, 2019

(65) Prior Publication Data

US 2019/0204837 A1 Jul. 4, 2019

Related U.S. Application Data

(63) Continuation of application No. 15/406,072, filed on Jan. 13, 2017, now Pat. No. 10,274,959.

(60) Provisional application No. 62/278,841, filed on Jan. 14, 2016.

(51) Int. Cl.
| | |
|---|---|
| G05D 1/02 | (2020.01) |
| B63H 25/04 | (2006.01) |
| B63H 25/12 | (2006.01) |
| B63H 25/38 | (2006.01) |

(52) U.S. Cl.
CPC .......... G05D 1/0206 (2013.01); B63H 25/04 (2013.01); B63H 25/12 (2013.01); B63H 25/38 (2013.01); B63B 2213/02 (2013.01)

(58) Field of Classification Search
CPC ........ G05D 1/02; G05D 1/0206; B63H 25/00; B63H 25/04; B63H 25/12; B63H 25/38; B63B 2213/02
USPC ........................................................ 701/21
See application file for complete search history.

(56) References Cited

U.S. PATENT DOCUMENTS

| | | |
|---|---|---|
| 6,311,634 B1 | 11/2001 | Ford |
| 6,868,317 B2 | 3/2005 | Okuyama |
| 8,726,825 B2 | 5/2014 | Gai et al. |
| 9,676,464 B2 | 6/2017 | Johnson et al. |
| 9,733,645 B1 | 8/2017 | Andrasko |
| 10,073,453 B2 | 9/2018 | Johnson et al. |
| 10,274,959 B2 * | 4/2019 | Estabrook .............. B63H 25/12 |

(Continued)

*Primary Examiner* — Lars A Olson
(74) *Attorney, Agent, or Firm* — Samuel M. Korte; Max M. Ali (57) ABSTRACT

A marine autopilot system is disclosed. While in autopilot mode, the marine vessel's autopilot system autonomously steers the marine vessel's rudder. Steering input provided using the helm typically results in counter-steering to the autopilot. If the autopilot is following a current heading or course (route), the autopilot may continue its efforts to remain on the heading or course in response to the deviation caused by steering input to the helm. The disclosed autopilot system improves this problem by including one or more sensors that measure helm movement and wirelessly transmit helm movement data to one or more components of the marine vessel's electronic network. If the operator of the marine vessel manually steers the helm to deviate from a current heading or course, helm movement exceeding a predetermined autopilot disengagement threshold may cause the autopilot control to temporarily disengage, allowing a user to manually steer the marine vessel.

20 Claims, 4 Drawing Sheets

(56) References Cited

U.S. PATENT DOCUMENTS

| | | |
|---|---|---|
| 2006/0025894 A1 | 2/2006 | O'Connor |
| 2012/0283912 A1 | 11/2012 | Lee et al. |
| 2013/0024071 A1 | 1/2013 | Sivertsen |
| 2016/0125739 A1 | 5/2016 | Stewart et al. |
| 2017/0205828 A1 | 7/2017 | Estabrook |
| 2017/0277189 A1 | 9/2017 | Johnson et al. |

\* cited by examiner

AUTOPILOT FEATURES FOR MARINE NAVIGATION

CROSS-REFERENCE TO RELATED APPLICATIONS

The present application is a continuation of, and claims priority benefit to, and commonly assigned U.S. Non-Provisional patent application Ser. No. 15/406,072, entitled "AUTOPILOT FEATURES FOR MARINE NAVIGATION," filed Jan. 13, 2017, which claims the benefit under 35 U.S.C. § 119(e) of U.S. Provisional Patent Application No. 62/278,841, entitled "Marine Autopilot," filed on Jan. 14, 2016. The above referenced applications are herein incorporated by reference in their entirety.

TECHNICAL FIELD

The present disclosure relates generally to marine autopilot systems and, more particularly, to a system that determines when to temporarily disengage a marine autopilot system in response to detected helm movement.

BACKGROUND

Marine vessels, such as boats, typically include a network of interconnected components such as sensors and controllers to facilitate propulsion and steering functions and, in some cases, provide users information relating to the speed, heading, and route of the marine vessel. These interconnected components may include autopilot controllers that autonomously steer the marine vessel according to a selected route or maintain a current heading. To do so, the autopilot system may monitor the location and heading of the marine vessel as well as other types of feedback to steer the marine vessel and remain on course or maintain a current heading. In the event that manual steering of the marine vessel is desired while the autopilot is engaged, the captain may disable the autopilot before providing manual input and re-engage the autopilot afterwards to avoid conflicting inputs to a rudder of the marine vessel. This procedure may be disruptive, time-consuming and repetitive when frequent deviations from the autonomously-steered heading or course are required.

Some conventional autopilot systems are equipped with a feature to allow for a temporary override of the autopilot, which is facilitated by detecting when the captain has turned the helm wheel by a certain amount, allowing the captain to steer the marine vessel without disengaging the autopilot. However, such features require integration of various components with the steering and propulsion components and controls of the marine vessel. In particular, for hydraulic actuator steering systems, the flow of hydraulic fluid resulting from a user turning a hydraulic helm is measured by installing one or more hydraulic flow sensors plumbed in line with the marine vessel's hydraulic steering lines. In other types of systems (e.g., non-hydraulic systems), expensive sensor and control components may be wired into the existing network of interconnected components to detect helm movement or, alternatively, entire components need to be replaced or upgraded, to implement the functionality of overriding the autopilot.

SUMMARY

The present disclosure is directed to technology that encompasses the use of a sensor to detect helm movement. Once helm movement is detected, autonomous control of the marine vessel may be disengaged to allow a user to manually steer the marine vessel by providing input to the helm. In an embodiment, a memory may be configured to store a predetermined autopilot disengagement threshold and a sensor unit may be mounted to the helm wheel and include one or more sensors and wireless radios. The sensor unit may be configured to wirelessly transmit helm movement data indicative of measured helm movement to one or more marine vessel components, which may utilize the helm movement data to determine whether the helm has moved in excess of a predetermined autopilot disengagement threshold. A marine vessel component (e.g., course control unit, chart plotter, etc.) may receive the helm movement data and cause disengagement of the autonomous steering of the rudder when the helm movement data exceeds the predetermined autopilot disengagement threshold. Autonomous steering of the rudder may be used to maintain a heading or charted course. In this way, the autopilot may temporarily disengage control of the rudder when movement of the helm is detected. In embodiments, the course control unit may be configured to re-engage the autonomous steering of the rudder when a current heading of the marine vessel is within a predetermined autopilot re-engagement threshold over a threshold time period.

In embodiments, a chart plotter coupled with the sensor unit may be configured to generate routing data indicative of a charted course for the marine vessel to follow and an autopilot may receive autopilot data and use the autopilot data to autonomously steer a rudder associated with the marine vessel to maintain the charted course in accordance with the routing data, receive the helm movement data and disengage the autonomous steering of the rudder using the autopilot data when the helm movement data exceeds the predetermined autopilot disengagement threshold.

In another embodiment, two or more sensor units may be implemented to detect helm movement. For example, one sensor unit may be mounted to the helm, as mentioned above, and a second, separate sensor unit may be mounted at another location on the marine vessel. In accordance with such embodiments, the first sensor unit measures helm movement and the second sensor unit measures the overall movement of the marine vessel. The second sensor unit may transmit marine vessel movement data to one or more marine vessel components. The marine vessel movement data may provide a base reference movement that is utilized by the one or more marine vessel components and/or the first sensor unit to subtract overall marine vessel movement from the helm movement. The resulting difference may better indicate actual helm movement, which may be used by the autopilot to selectively engage and disengage autonomous control of the marine vessel's rudder.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

Marine autopilot systems may provide autonomous steering functionality. To do so, an operator, such as a captain, typically desires to maintain a current heading or follow a course determined by a chart plotter. Chart plotters determine a navigable route from a current location to a destination and provide directional vectors for each leg of the calculated route. The chart plotter also communicates with other components of the marine vessel that are interconnected through a networked system. As a result, directional vectors determined by the chart plotter may be shared or otherwise communicated to other electronic components on the network, such as an autopilot, for example. The autopilot may use the received directional vector information provided by the chart plotter to autonomously send commands to an actuator coupled with the rudder to cause changes in the position of the rudder. The changes in rudder position may cause the marine vessel to follow a current heading or remain on the course charted using the chart plotter.

In embodiments where the autopilot functionality is utilized to remain on a course (route) to a destination, a processor of the course control unit may receive directional vectors for each leg of the calculated route from a chart plotter and provide commands to the actuator that causes the marine vessel to remain on the course. In embodiments where the autopilot functionality is utilized to maintain a heading of the marine vessel, a processor of the course control unit may determine a current compass heading of the marine vessel based on sensory information (e.g., from a gyroscope, accelerometer, magnetometer, etc.) and/or geographic position information received from a position-determining component (e.g., a GPS receiver). Because wind or water current may cause the marine vessel to occasionally point in a direction that is different than its direction of travel, the processor may use the sensory information (integrated within the autopilot or received from an external source) to determine the direction the marine vessel is pointing and its direction of travel. The processor may provide commands to an actuator that causes the marine vessel to maintain the current heading. The course control unit may maintain that heading in response to receiving a user input desiring such functionality. For instance, the autopilot system may determine movement of the marine vessel relative to a desired compass heading (e.g., maintaining a heading, moving away from the heading, or moving toward the heading) and send commands to an actuator causing changes in the position of the rudder for the marine vessel to continue traveling along a desired heading. The autopilot may determine and provide such commands regardless of the position of rudder or rudder transducer.

Therefore, the rudder of the marine vessel is autonomously controlled via the autopilot while the autopilot functionality is engaged. The course control unit may monitor the marine vessel's current position, determine a current heading, and maintain the current heading. The course control unit may also monitor the marine vessel's current position, and remain on a course by using the directional vector information received from a chart plotter. If the captain attempts to provide manual input (steer) the marine vessel using the helm while autopilot is engaged, such manual input will cause the marine vessel to travel in a new heading that is different from a current directional vector or a determined compass heading that being utilized to provide autopilot functionality. Therefore, if an input is provided to the helm while the autopilot is engaged, the autopilot will observe a change in course or heading and attempt to correct this deviation by counter steering the rudder to compensate. As a result, the captain may need to manually disengage the autopilot functionality (e.g., by interacting with controls provided on a device coupled with the course control unit) when desiring to deviate from a current heading or plotted course to avoid undesired input from the course control unit during the deviation.

Figure 1:
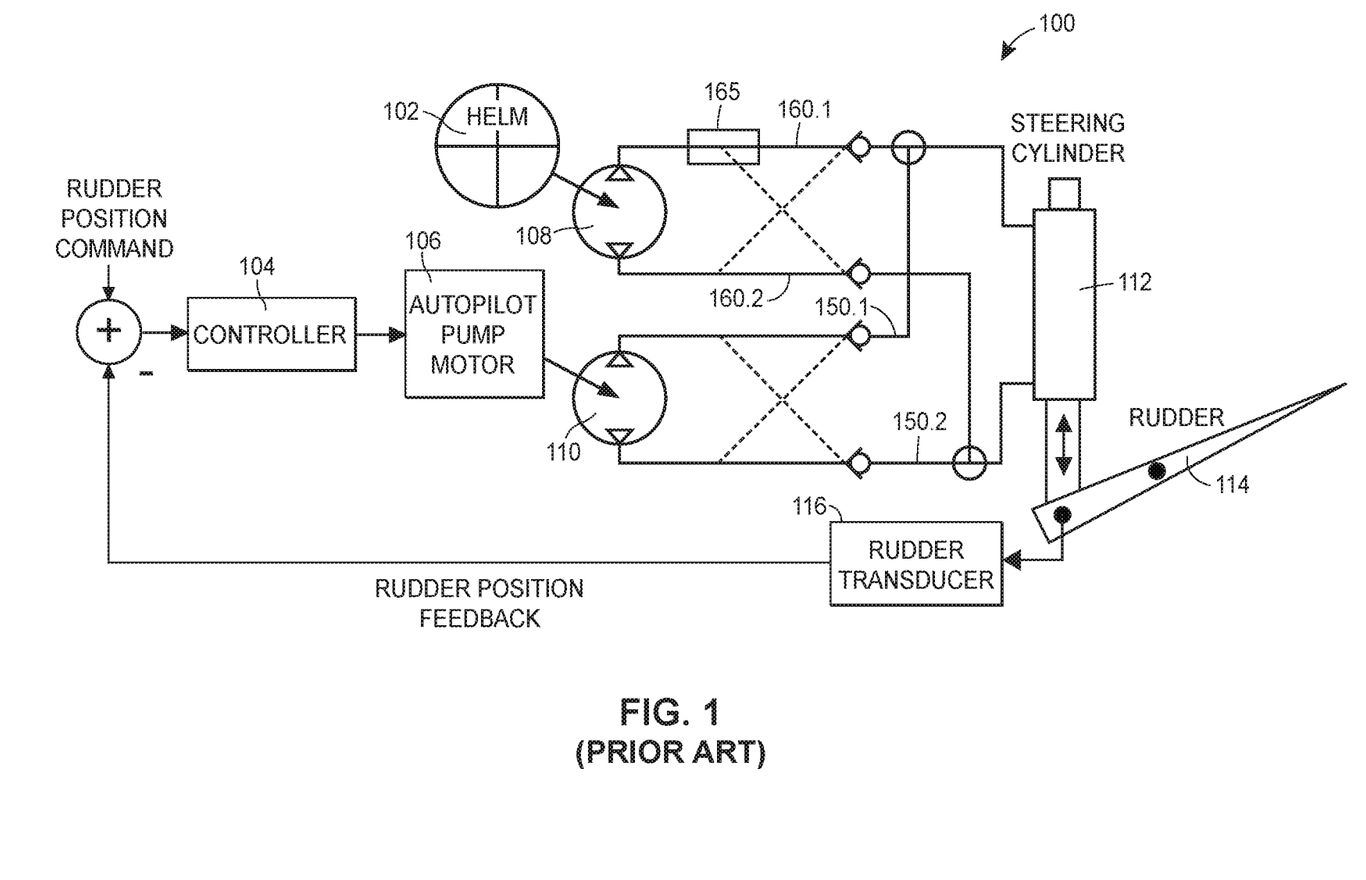
FIG. 1 is a block diagram illustrating a conventional steering system 100 implementing autopilot.

Some conventional autopilot systems utilize a sensor to detect helm steering by coupling the sensor directly with components used to provide helm steering. The conventional autopilot systems disengage the autopilot when helm steering is detected to avoid undesired input from the autopilot system during a deviation caused by manual input to the helm. An example of a conventional steering system 100 that implements helm steering detection to implement autopilot functionality is shown in FIG. 1. The autopilot steering system shown in FIG. 1 implements a system including a hydraulic rudder actuator.

The conventional steering system 100 utilizes a hydraulic fluid flow sensor 165 that is plumbed in line with one of hydraulic lines 160.1 or 160.2 between the helm pump 108 and the steering cylinder 112. Hydraulic fluid flow sensors 165 may output a signal indicative of fluid flowing through hydraulic lines 160.1 and 160.2 at a rate exceeding a predetermined threshold. The signal may assist with a conventional steering system 100 detecting hydraulic fluid flow exceeding a predetermined threshold, which may be based on a mechanical adjustment or composition of hydraulic fluid flow sensors 165. In embodiments, hydraulic fluid flow sensors 165 output an analog signal corresponding to a direction and rate of fluid flowing through hydraulic lines 160.1 and 160.2. The conventional steering system 100 monitors this analog signal and disengages the autonomous control of rudder 114 based on autopilot control when the analog signal indicates hydraulic fluid flow exceeding a threshold flow level through hydraulic fluid flow sensor 165.

The hydraulic actuator system includes two separate hydraulic lines plumbed in parallel with one another. That is, conventional steering system 100 includes a helm 102 coupled to a helm pump 108, which is in turn coupled to hydraulic lines 160.1 and 160.2 that actuate steering cylinder 112 to provide steering input to a rudder 114. Additionally, conventional steering system 100 includes an autopilot pump motor 106 coupled to autopilot pump 110, which is in turn coupled to hydraulic lines 150.1 and 150.2 that actuate steering cylinder 112 to provide steering input to rudder 114. Conventional steering system 100 also includes a rudder transducer 116 that provides rudder position feedback to controller 104 in addition to rudder position commands. Other conventional steering systems do not monitor rudder position. Controller 104 may then generate appropriate signals to control autopilot pump motor 106 based upon the rudder position commands received from the autopilot and the rudder position feedback. Thus, rudder 114 may be independently controlled by helm 102 coupled to helm pump 108 (helm control) or by autopilot pump motor 106 coupled to autopilot pump 110 (autopilot control).

In the configuration shown in FIG. 1, hydraulic lines 150.1 and 150.2 are associated with the autopilot control and hydraulic lines 160.1 and 160.2 are associated with the helm control. Hydraulic lines 150.1 and 150.2 operate independently of hydraulic lines 160.1 and 160.2. To this end, check valves are commonly installed in each independent hydraulic system to minimize operation of one hydraulic system from influencing the other. Because of this independent operation, the operator (captain) may be "fighting" the autopilot system when attempting to steer with helm 102 if the autopilot system is not disengaged. The conventional autopilot system may attempt to compensate for undesired changes in the position of rudder 114 based upon the rudder position feedback received via rudder transducer 116 unless the captain disengages the autopilot system prior to steering the helm.

A drawback of the conventional steering system 100 is the installation of hydraulic fluid flow sensor 165. Installation of a hydraulic fluid flow sensor 165 often requires removal of various boat panels and the helm 102 to obtain access to hydraulic lines 160.1 and 160.2. This process may be very time consuming and arduous after the boat is manufactured and assembled. Therefore, the present disclosure aims to solve the aforementioned issues by introducing a helm steering sensor system that may be implemented as part of an autopilot system without requiring installation of sensors along the hydraulic lines.

Figure 2:
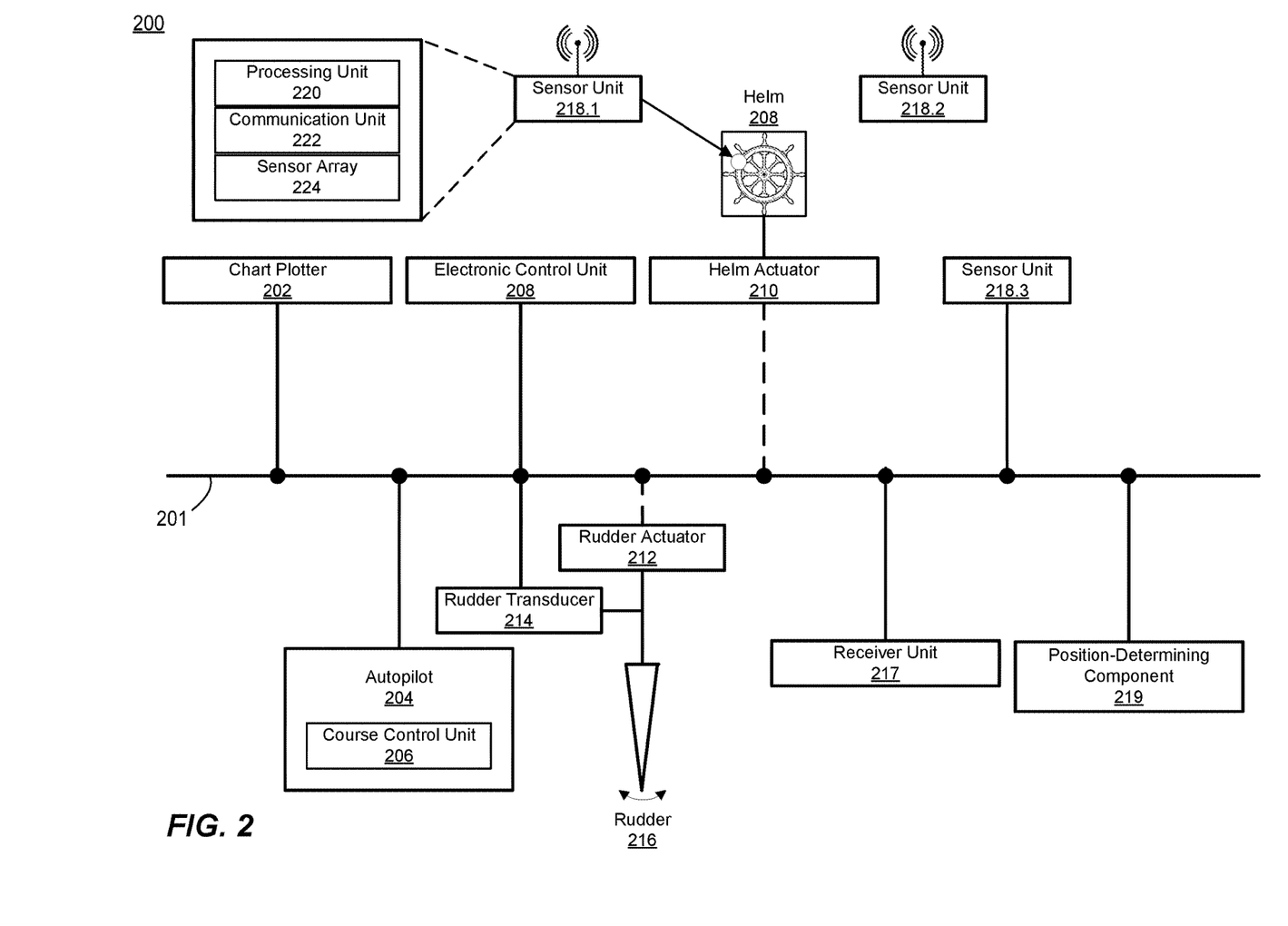
FIG. 2 is a block diagram example illustrating interconnected marine vessel components of an autopilot steering system 200, according to an embodiment.

FIG. 2 is a block diagram example illustrating interconnected marine vessel components of an autopilot steering system 200, according to an embodiment. In an embodiment, autopilot steering system 200 includes a chart plotter 202, an autopilot 204, an electronic control unit (ECU) 208, a rudder actuator 212, a rudder transducer 214, a rudder 216, a helm 208, a helm actuator 210, a receiver unit 217, sensor units 218.1-218.3, and position-determining component 219.

FIG. 2 illustrates the various components of autopilot steering system 200 as being coupled to or otherwise interconnected to one another via a network 201. However, embodiments include one or more of the components of autopilot steering system 200 being coupled to one another in any suitable manner, which may include additional or alternate couplings not shown in FIG. 2 for purposes of brevity. For example, rudder transducer 214 may provide rudder positional data to autopilot 204 via a direct wired connection, a wireless connection, or an alternate network.

Furthermore, the various components of autopilot steering system 200 may be optionally connected to network 201 depending on their specific implementation. For example, in some embodiments, helm actuator 210 and/or rudder actuator 212 may be implemented as part of a hydraulic actuator steering system, which may not need to communicate with network 201, and therefore helm actuator 210 and/or rudder actuator 212 need not be connected to network 201 in such implementations. To provide another example, in other embodiments helm actuator 210 and/or rudder actuator 212 may be implemented as part of an electronic actuator steering system, which may provide helm command data and/or rudder command data via network communications over network 201.

Furthermore, the embodiments described herein are compatible with any suitable type of helm control and steering system. For example, when implemented as part of a hydraulic actuator steering system, helm actuator 210 and rudder actuator 212 may represent any combination of helm pumps, autopilot pumps, hydraulic lines associated with helm pumps and autopilot pumps, check valves, steering cylinders, mechanical arms, etc. To provide another example, when implemented as part of an electronic actuator steering system, helm actuator 210 and rudder actuator 212 may represent any combination of stepper motors, encoders, servos, electronic sensors, etc.

In various embodiments, network 201 may be implemented as any suitable communication network configured to facilitate data communications between one or more interconnected components of autopilot steering system 200, such as any suitable wired network, wireless network, or combinations thereof. For example, network 201 may be implemented as a network in accordance with any one of the National Marine Electronics Association (NMEA) specifications such as NMEA 0180, NMEA 0183, NMEA 2000, or future standards incorporating the NMEA standard as of the time of this writing. In accordance with such embodiments, each of the interconnected components in a particular implementation of autopilot steering system 200 may be coupled to network 201 via RJ-45 Ethernet connectors and communicate. In this way, each interconnected component of autopilot steering system 200 may communicate with one another over network 201.

Most marine vessels utilize one or more NMEA networks to connect various instruments, some of which are not shown in FIG. 2 for purposes of brevity. For example, a typical marine vessel's NMEA networks may support communication between other components such as echo sounders, sonars, anemometers, etc. Therefore, embodiments of the disclosure that utilize the NMEA network are particularly useful to ensure backward compatibility with instruments already in use by a particular marine vessel. In such a case, the functionality discussed herein may be added on to a marine vessel's existing NMEA network, as the marine vessel's existing components may already be configured to send and receive communications over the NMEA network and support a defined command structure.

For instance, autopilots may be configured to receive commands from other network-connected components in addition to the directional vector data received from the chart plotter. These commands may include, for example, commands that instruct the autopilot to engage or disengage autopilot control. As discussed above, the chart plotter may temporarily disable the autopilot using such commands when various conditions occur such as the detection of helm movement through a hydraulic fluid flow sensor or a user selecting a disengage command via a user interface presented on the chart plotter. The embodiments discussed herein may leverage this existing command structure but add new trigger conditions that, when satisfied, result in the autopilot system being engaged and disengaged. These trigger conditions are related to various metrics measured by one or more of sensor units 218.1-218.3 and are further discussed below. However, before introducing these trigger conditions in further detail, the functionality of each component of autopilot steering system 200 is first introduced.

In an embodiment, chart plotter 202 is configured to communicate with other components of autopilot steering system 200 and to generate routing data indicative of a charted course for the marine vessel to follow. To facilitate this functionality, chart plotter 202 may include any suitable number and/or type of processors, memory, transceivers, ports, antennas, network interfaces, displays, user interfaces, etc. In some embodiments, chart plotter 202 may be implemented as an off-the-shelf chart plotter configured to communicate with additional external components as well as the components connected to network 201.

To do so, chart plotter 202 may be configured to support data communications in accordance with other communication protocols in addition to those used for communications via network 201. For example, chart plotter 202 may be configured to support wired and/or wireless communications with any suitable device not directly connected to network 201, such as sensor units 218.1 and 218.2 or a smartphone or other mobile computing device. Examples of wireless communication standards that may be implemented by chart plotter 202 include, but are not limited to, networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; ZigBee standards promulgated by the ZigBee Alliance; Bluetooth standards promulgated by the Bluetooth Special Interest Group; ANT or ANT+ standards promulgated by Dynastream Innovations, Inc.; and so on.

To perform chart plotting functions, chart plotter 202 may determine the position of the marine vessel in which it is installed and use this position as the starting point for a new charted course. Using the determined position of the marine vessel, chart plotter 202 may determine a route and output routing data onto network 201, which may include a directional vector for the current leg of the route. Once transmitted to network 201, this information may be utilized by other components connected to network 201 (e.g., autopilot 204). Chart plotter 202 may determine the position of the marine vessel by communicating with position-determining component 219, which is also connected to network 201. Chart plotter 202 may alternatively incorporate its own position-determining component that is configured to perform the same functions as position-determining component 219, which is further discussed below.

Position-determining component 219 may receive signal data transmitted by one or more position data platforms and/or position data transmitters, such as Global Positioning System (GPS) satellites. More particularly, position-determining component 219 may manage and process signal data received from GPS satellites via a GPS receiver. Position-determining component 219 may thus determine a geographic position by processing the received signal data, which may include various data suitable for use in position determination, such as timing signals, ranging signals, ephemerides, almanacs, and so forth.

Position-determining component 219 may also be configured to provide a variety of other position-determining functionality. Position-determining functionality, for purposes of discussion herein, may relate to a variety of different navigation techniques and other techniques that may be supported by "knowing" one or more positions. For instance, position-determining functionality may be employed to provide position/location information, timing information, speed information, and a variety of other navigation-related data. Accordingly, position-determining component 219 may be configured in a variety of ways to perform a wide variety of functions. For example, position-determining component 219 may be configured for marine navigation (e.g., when implemented within chart plotter 202); however, position-determining component 219 may also be configured for other vehicle navigation or tracking.

Position-determining component 219, for example, can use signal data received via a GPS receiver in combination with map data that is stored in memory to generate navigation instructions (e.g., leg-by-leg instructions to an input destination or POI), show a current position on a map, and so on. Position-determining component 219 may include one or more antennas to receive signal data. Position-determining component 219 may also provide other position-determining functionality, such as to determine an average speed, calculate an arrival time, and so on.

Although a GPS system is described in relation to FIG. 2, it should be apparent that a wide variety of other positioning systems may also be employed, such as other global navigation satellite systems (GNSS), terrestrial based systems (e.g., wireless-phone based systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros, odometers, and magnetometers), use of "dead reckoning" techniques, and so on.

In an embodiment, autopilot 204 is configured to communicate with other components of autopilot steering system 200, to receive routing data that is generated by chart plotter 202, to monitor the current location, speed, and heading of the marine vessel, and to autonomously steer rudder 216 using the routing data received from chart plotter 202 to maintain a currently charted course. To facilitate this functionality, autopilot 204 may include any suitable number and/or type of processors, memory, transceivers, ports, antennas, network interfaces, etc.

In an embodiment, autopilot 204 may include a course control unit (CCU) 206 that functions as the main processing component of the autopilot 204. CCU 206 may be implemented, for example, as any suitable number and/or type of computer processors that receive autopilot data, geographic position data, routing data, and/or rudder positional data and utilize any combination of this data to facilitate autonomous control of rudder 216.

For example, because autopilot 204 is configured to communicate with other components of autopilot steering system 200 via network 201, the autopilot data may include any suitable type of information relevant to autonomous rudder steering. Geographic position data may include geographic coordinates obtained from position-determining component 219 indicating the current location of the marine vessel, the current speed and heading of the marine vessel, the current time, etc. Autopilot 204 may determine a heading for the marine vessel based on the received geographic position data (received from a position-determining component, such as a GPS receiver) and/or sensory information (e.g., from a gyroscope, accelerometer, magnetometer, etc.). The sensory information may be received from a sensor integrated within the autopilot or received from an external sensory source. In embodiments, the autopilot 204 may determine a tilt angle, acceleration and magnetic heading of the marine vessel and determine a current heading of the marine vessel based on the determined tilt angle, acceleration and magnetic heading. Because wind or water current may cause the marine vessel to occasionally point in a direction that is different than its direction of travel, the processor may use the sensory information to determine the direction the marine vessel is pointing and its direction of travel.

Autopilot 204 may additionally receive rudder position feedback received from rudder transducer 214 indicative of the current position of rudder 216. CCU 206 may utilize the received autopilot data, geographic position data, rudder position feedback, and routing data to determine whether rudder 216 needs to be steered to a new position by analyzing the current position of the rudder and the current heading and/or route of the marine vessel. Thus, CCU 206 determines an amount to rotate rudder 216 to maintain current heading or route (in accordance with routing data received from the chart plotter 202) of the marine vessel.

In an embodiment, CCU 206 calculates adjustments in the position of rudder 216, formats these adjustments as suitable control signals in accordance with the particular implementation of rudder actuator 212, and transmits the control signals to electronic control unit (ECU) 208. The ECU 208 receives the control signals from CCU 206 and causes changes in the position of rudder 216 by changing the position of an actuator. For example, in a hydraulic actuator steering system, the control signals may cause ECU 208 to activate an autopilot pump motor, resulting in a hydraulic autopilot pump forcing hydraulic fluid in a particular direction to a steering cylinder coupled to the rudder. To provide another example, in an electronic actuator steering system, the control signals may cause ECU 208 to activate a stepper motor or other suitable servo, resulting in rudder 216 being deflected to a desired angle to maintain a current heading or route.

CCU 206 may also receive movement data from one or more sensor units 218.1-218.3 that may be indicative of helm movement and marine vessel movement. As further discussed below, this movement data may be received wirelessly from sensor units external to network 201 (e.g., sensor units 218.1-218.2) or via one or more sensor units connected to network 201 (e.g., sensor unit 218.3). CCU 206 may disengage the autonomous steering of the rudder 216 when the movement of the helm exceeds a predetermined autopilot disengagement threshold. For example, the predetermined autopilot disengagement threshold may be an amount of rotation (e.g., accelerometer data from sensor unit indicating rotation in excess of 45 degrees will cause disengagement of the autonomous steering), rate of rotation (e.g., gyroscope data from sensor unit indicating rotation in excess of 3 degrees/second for 2 seconds), or rate of rotational acceleration (e.g., gyroscope data from sensor unit indicating acceleration of rotation in excess of 3 degrees/second for 2 seconds). CCU 206 may cause autopilot 204 to enter a standby mode or to temporarily pause sending control signals to ECU 208 when autopilot functionality is disengaged.

CCU 206 may cause autopilot 204 to resume control when movement data received from sensor units 218.1-218.3 indicates that the helm has returned to its original position or when a heading (determined based on geographic position data) indicates that the heading marine vessel has stabilized. In embodiments, CCU 206 may determine that the heading has stabilized when the current heading of the marine vessel is within a predetermined autopilot re-engagement threshold over a threshold time period. For instance, the predetermined autopilot re-engagement threshold may be a heading deviating within 3-5 degrees/second and the threshold time period may be 30 seconds at a first velocity of the marine vessel. The predetermined autopilot re-engagement threshold may be a heading deviating less than 15 degrees. Alternatively, the predetermined autopilot re-engagement threshold may be a heading deviating within 10 degrees/second and the threshold time period may be 60 seconds at a second velocity of the marine vessel (the second velocity being less than the first velocity). Once the CCU 206 causes autopilot 204 to resume control, autopilot 204 may maintain the current (stabilized) heading of the marine vessel or remain on a course (route) to a destination.

In another embodiment, CCU 206 may not receive the movement data, but may instead receive a command or indication to disengage autopilot 204. For example, one or more other components of autopilot steering system 200 may determine when the movement of the helm exceeds a predetermined autopilot disengagement threshold and transmit a command to autopilot 204, which is received by CCU 206 and acted upon to disengage autopilot 204. In such a case, CCU 206 may disengage autopilot 204 without necessarily analyzing the movement data. In this way, various embodiments include one or more components of autopilot steering system 200 performing varying levels of functionality with regards to receiving movement data, processing the movement data, and acting upon the movement data. The functionality of sensor units 218-1-218.3 is now described, after which these varying levels of functionality are further described with reference to sensor units 218-1-218.3, chart plotter 202, autopilot 204, and receiver unit 217.

Again, autopilot steering system 200 may include one or more sensor units, such as sensor units 218.1-218.3, as shown in FIG. 2. Although autopilot steering system 200 is illustrated in FIG. 2 as including three sensor units, embodiments include autopilot steering system 200 including any suitable number of sensor units. In various embodiments, the sensor units implemented by autopilot steering system 200 may be connected to network 201 (e.g., sensor unit 218.3) or be separate, external sensor units configured to wirelessly communicate with one or more components of autopilot steering system 200, which are in turn connected to network 201 (e.g., sensor units 218.1-218.2). Regardless of whether a sensor unit is an external device or is connected to network 201, any one of sensor units 218.1-218.3 may be configured to measure the movement of helm 208 or the movement of the marine vessel, and to communicate varying levels of information regarding this movement to one or more components of autopilot steering system 200.

To facilitate this functionality, each of sensor units 218.1-218.3 may include a processing unit 220, a communication unit 222, and a sensor array 224. This is shown in FIG. 2 with reference to sensor unit 218.1, although it will be understood that each of sensor units 218.1-218.3 may include similar or alternate components depending on each sensor unit's implementation. For example, sensor unit 218.3 may be configured to interface with network 201 and include any suitable network interface to do so, while sensor units 218.1-218.2 may instead communicate wirelessly, and therefore not require hardware to interface directly with network 201.

Processing unit 220 may be implemented as any suitable type and/or number of processors, such as a host processor of a respective one of sensor units 218.1-218.3, for example. To provide additional examples, processing unit 220 may be implemented as an application specific integrated circuit (ASIC), an embedded processor, a central processing unit associated with a respective one of sensor units 218.1-218.3, etc. Processing unit 220 may be coupled with and/or otherwise configured to communicate, control, operate in conjunction with, and/or affect operation of communication unit 222 and/or sensor array 224 via one or more wired and/or wireless interconnections, such as any suitable number of data and/or address buses, for example. These interconnections, as well as other components of sensor units 218-218.3, such as power sources and memory, are not shown in FIG. 2 for purposes of brevity.

To provide an example, processing unit 220 may be configured to retrieve, process, and/or analyze movement data (e.g. helm movement data) generated by one or more sensors implemented by sensor array 224 and to wirelessly receive data from other sensor units (e.g., marine vessel movement data. Furthermore, processing unit 220 may be configured to wirelessly communicate with one or more components of autopilot steering system 200 (e.g., chart plotter 202, autopilot 204, and receiver unit 217), to determine when the movement of the helm exceeds a predetermined autopilot disengagement threshold, to transmit helm movement data and/or marine vessel movement data, to transmit an indication that the movement of the helm 208 exceeds a predetermined autopilot disengagement threshold, etc. Additional details associated with such functions are further discussed below. Processing unit 220 may work in conjunction with communication unit 222 and/or sensor array 224 to transmit sensor data generated by sensor array 224 in accordance with any suitable schedule or rate. For example, sensor unit 218.1 may transmit helm movement data and/or marine vessel movement data continuously, every 100 milliseconds, 500 milliseconds, every second, etc.

Communication unit 222 may be configured to support any suitable number and/or type of communication protocols to facilitate communications between sensor unit 218.1, other sensor units, and/or one or more components of autopilot steering system 200. Communication unit 222 may be configured to facilitate the exchange of any suitable type of information between sensor unit 218.1 and these other components, and may be implemented with any suitable combination of hardware and/or software to facilitate such functionality. For example, communication unit 218.1 may be implemented with any suitable number of wired and/or wireless transceivers, ports, connectors, etc., which are not shown in FIG. 2 for purposes of brevity.

Sensor array 224 may be implemented as any suitable number and/or type of sensors configured to measure, monitor, and/or quantify one or more environmental characteristics such as helm movement or marine vessel movement. For example, sensor array 224 may include one or more accelerometers, gyroscopes, and/or magnetometers configured to measure sensor metrics in one or more axes. To provide further examples, sensor array 224 may include one or more compasses, speedometers, barometers, thermometers, proximity sensors, light sensors (e.g., light intensity detectors), strain gauges, photodetectors, photoresistors, photodiodes, Hall Effect sensors, electromagnetic radiation sensors (e.g., infrared and/or ultraviolet radiation sensors), ultrasonic and/or infrared range detectors, humistors, hygrometers, altimeters, microphones, etc.

One or more of sensor units 218.1-218.3 may be configured to be mountable or otherwise affixed to helm 208. For example, sensor unit 218.1 may be mounted to helm 218.1 at any suitable location to detect changes in helm movement. However, because marine vessels may have different helm designs and configurations, sensor array 224 may be implemented with different sensor types to accommodate these different helm configurations. Alternatively, different variations of sensor unit 218.1 may be manufactured such that sensor array 224 is implemented with a single type of sensor best suited to a particular helm configuration, allowing a user to select the appropriate type of sensor unit based upon his helm configuration.

For example, helm 208 may be mounted vertically (i.e., perpendicular to the water), horizontally (parallel with the water), or at some angle between the vertical and the horizontal (e.g., at a 45-degree angle to the water). Assuming that sensor unit 218.1 is mounted to helm 208, sensor unit 218.1 may function as an attitude sensor by detecting angular movements as a result of helm 208 being turned. To provide an illustrative example, if sensor array 224 implements a 3-axis accelerometer, this will detect the direction of the force of Earth's gravity. As helm 208 is turned, the orientation of the accelerometer sensor (which is mounted to the helm 208) will change, resulting in a change in the direction of the force of gravity detected by each accelerometer's axis. When the marine vessel is still and the helm is mounted vertically, the sensor metrics generated by a three-axis accelerometer allow for the detection of helm 208 being turned on the order of a few degrees (e.g., 2 or 3 degrees). Thus, embodiments include detecting helm movement by determining whether helm movement (i.e., angular movement) of the helm 208 exceeds a particular predetermined autopilot disengagement threshold helm angle. However, if the helm 208 is tilted 45 degrees, then the 3-axis accelerometer will generate sensor metrics indicating only 90 degrees of rotation for every 180 degrees of helm rotation. Furthermore, if the helm 208 is mounted flat (i.e., horizontally), then the 3-axis accelerometer will measure no change for any amount of helm turn.

Therefore, if sensor array 224 only implements an accelerometer sensor, then sensor unit 218.1 would be particularly useful for when helm 208 is mounted vertically or at a slight angle (i.e., 45 degrees or less). However, for other configurations of helm 208, it is preferable for sensor unit 218.1 to utilize additional or alternate sensors. For example, sensor array 224 may implement a gyroscope sensor that measures the rate at which the helm 208 is turned, which can be measured with a gyroscope sensor for any helm orientation. In such a case, embodiments include detecting when helm 208 has been steered in excess of a particular predetermined autopilot disengagement threshold helm angle. But in this case, the helm movement may be determined based upon the measured rate of helm movement in the same direction over a time period that yields an accumulated helm movement exceeding the predetermined autopilot disengagement threshold helm angle. For example, if a gyroscope sensor measures helm 208 being turned at a rate of 30 degrees per second and this rate is maintained for a full second, then processing unit 220 may calculate that helm 208 has been turned 30 degrees, and compare this value to the disengagement threshold helm angle to determine whether movement of the helm 208 exceeds a particular disengagement threshold helm angle.

To provide another example, sensor array 224 may implement a magnetometer sensor, which may be particularly useful when helm 208 has a flat-mounted configuration. A magnetometer sensor can detect changes in the orientation of helm 208 with respect to the Earth's magnetic field, and thus movement of the helm 208 beyond a predetermined autopilot disengagement threshold angle can be detected. However, magnetometers have operational issues when electronics and ferrous metals are nearby, and therefore a gyroscope sensor may be better suited for flat helm configurations in such instances.

Regardless of the type of sensor(s) implemented by sensor array 224, any sensor mounted to helm 208 may be configured to measure the angular movement of helm 208 as well as other marine vessel movement. For example, the when navigating a charted course, sensor 218.1 will not measure movements of the helm in isolation, but the overall movement of the helm in the water, which may include marine vessel movement such as turning, pitching, and yawing. To remedy this, a predetermined autopilot disengagement threshold angle may be selected that is sufficiently high in magnitude to avoid false alarms. In other words, by selecting a sufficiently high helm angle disengagement threshold, the likelihood that the marine vessel movement is violent enough to trigger a false alarm is greatly reduced. However, a smaller helm angle disengagement threshold may be desirable to cause the autopilot to disengage sooner, thereby avoiding longer periods of time in which the captain needs to fight against the autopilot's autonomous rudder steering control.

Therefore, embodiments include autopilot steering system 200 utilizing a second sensor unit that is mountable to another location of the marine vessel other than the helm. The second sensor unit may be mounted at a location near the helm of the marine vessel to provide sensory information that may be used by the autopilot steering system 200 to isolate intentional inputs to helm 208 sensed by sensor unit 218.1. As shown in FIG. 2, this second sensor unit may include, for example, sensor unit 218.2 or sensor unit 218.3. In various embodiments, the second sensor unit 218.2 or 218.3 may be a separate external sensor unit (as shown in FIG. 2), or be integrated as part of one or more components of autopilot steering system 200. Furthermore, although it may be preferable to mount the second sensor unit near the helm 208 (but not mounted to helm 208), the second sensor unit may be mounted to any location on the marine vessel other than the helm 208. For example, sensor unit 218.2 or sensor unit 218.3 may be integrated as part of chart plotter 202, autopilot 206, or receiving unit 217. In any event, the second sensor unit may generate marine vessel movement data indicative of the overall movement of the marine vessel and/or transmit the marine vessel movement data to one or more components of autopilot steering system 200. Again, this marine vessel movement data (and the helm movement data measured by other sensor units) may be sampled and transmitted at any suitable rate. In embodiments, the marine vessel movement data may be used as a reference to reject false detections of helm movement due to the movement of the marine vessel. In particular, a calibration step may be implemented (e.g., via a suitable user interface associated with chart plotter 202) to isolate or lock down the plane of movement of the helm 208 so an amount of boat pitching, turning, and yawing can be subtracted or otherwise filtered out of the helm movement data measured by sensor unit 218.1.

Again, in various embodiments, sensor units 218.1-218.3, chart plotter 202, autopilot 204, and receiver unit 217 have varying levels of functionality depending upon the specific implementation, configuration, and operation of each of these components. The functionality of these components may depend, for example, upon the type of data transmitted via one or more of sensor units 218.1-218.3 and/or the level of functionality of sensor units 218.1-218.3. For example, with reference to sensor unit 218.1, this sensor unit may perform different levels of sensor data acquisition and processing, in various embodiments.

In one embodiment, sensor unit 218.1 may generate helm movement data using one or more sensors implemented as part of sensor array 224 and wirelessly transmit this helm movement data. In embodiments in which more than one sensor unit is utilized, sensor unit 218.2, for example, may similarly generate and wirelessly transmit marine vessel movement data. The transmitted helm movement data and the marine vessel movement data may be raw or unprocessed sensor data, or be processed by each respective sensor. When the data is processed, the helm movement data and/or the marine vessel movement data may represent, for example, actual movement information such as an amount of helm angle movement, a rate of helm movement, the amount of marine vessel movement in one or more axes, etc.

In any event, the unprocessed or processed helm movement data and marine vessel movement data, as the case may be, may be utilized by one or more of chart plotter 202, autopilot 204, or receiver unit 217 to determine when to disengage autonomous steering of rudder 216. In one embodiment, chart plotter 202 receives the helm movement data (and optionally receives the marine vessel movement data) and relays this data onto network 201 for use by one or more other components of autopilot steering system 200, such as autopilot 204, for example. In another embodiment, autopilot 204 may wirelessly receive the helm movement data (and optionally the marine vessel movement data) directly from each sensor unit or via network 201 in the case of sensor unit 218.3. CCU 206 may then analyze the data to determine whether movement of the helm 208 has exceeded a predetermined autopilot disengagement threshold by analyzing the helm movement data or a combination of the helm movement data and marine vessel movement data, as the case may be. If movement of the helm 208 has exceeded the disengagement threshold, then CCU 206 may disengage autopilot 204 and no longer provide autonomous steering of the rudder 216.

Continuing the previous example with respect to sensor units 218.1 and 218.2, in other embodiments, sensor unit 218.1 may process the helm movement data to determine whether movement of the helm 208 has exceeded a predetermined autopilot disengagement threshold. When a dual-sensor unit system is implemented, sensor unit 218.1 may also wirelessly receive the marine vessel movement data from sensor unit 218.2, process the helm movement data and the marine vessel movement data to filter out marine vessel movement, and determine whether movement of the helm 208 has exceeded a predetermined autopilot disengagement threshold. If it is determined that the movement of the helm 208 has exceeded the disengagement threshold, embodiments include sensor unit 218.1 being configured to wirelessly transmit a helm steering indicator. This helm steering indicator may then be received by chart plotter 202 or receiver unit 217 and relayed to network 201 where is it received by autopilot 204. Alternatively, autopilot 204 may directly receive the helm steering indicator from sensor unit 218.1. In any event, upon receiving the helm steering indicator, CCU 206 may disengage autopilot 204 to no longer provide autonomous steering of the rudder 216.

In another embodiment, chart plotter 202 may receive the helm movement data or a combination of the helm movement data and marine vessel movement data. Chart plotter 202 may analyze the received data, determine whether movement of the helm 208 has exceeded a disengagement threshold and, if so, transmit a helm steering indicator to autopilot 204 via network 201. Again, upon receiving the helm steering indicator, CCU 206 may disengage autopilot 204 to no longer provide autonomous steering of the rudder 216.

In still other embodiments, it may be preferable to have a dedicated unit for performing the aforementioned data processing functions. This may be particularly useful, for example, when a "plug-and-play" solution is desired, or to ensure backward compatibility with older marine vessel components. For example, receiver unit 217 may be configured to communicate with one or more components of autopilot steering system 200 via network 201 and/or wirelessly. Receiver unit 217 may be configured to perform any of the functions previously discussed with respect to chart plotter 202, sensor units 218.1-218.3, and/or autopilot 204 with regards to processing helm movement data and/or marine vessel movement data. Additionally or alternatively, receiver unit 217 may be configured to emulate traditional commands sent by chart plotter 202 to disengage autopilot 204. In this way, receiver unit 217 may be plugged into network 201 (e.g., via a standardized connector when network 201 is implemented as a NMEA network) and function to offload processing functions while ensuring backward compatibility with other marine vessel components.

For example, receiver unit 217 may receive helm movement data (or a combination of helm movement data and marine vessel movement data) from one or more sensor units 218.1-218.3 or from chart plotter 202, if the data is related to network 201. Receiver unit 217 may determine whether movement of the helm 208 has exceeded a predetermined autopilot disengagement threshold and, if so, transmit a helm steering indicator to autopilot 204. Although illustrated as a separate component in FIG. 2, receiver unit 217 may be integrated as part of chart plotter 202, autopilot 204, one of sensor units 218.1-218.3 (e.g., sensor unit 218.2 when acting as the second sensor generating marine vessel movement data), etc.

The embodiments discussed above explain CCU 206 disengaging autonomous steering of rudder 216 when movement of the helm 208 exceeds a predetermined autopilot disengagement threshold. Again, in various embodiments, chart plotter 202, CCU 206, receiving unit 217, and/or sensor unit 218.1-218.3 may make this determination based upon helm movement data, a combination of helm movement data and marine vessel movement data, or a received helm steering indicator. Additionally, embodiments include CCU 206 re-engaging autonomous steering of rudder 216 when one or more conditions are satisfied. For example, upon disengaging autopilot control of rudder 216, chart plotter 202, CCU 206, receiving unit 217, and/or sensor unit 218.1-218.3 may start a timer or otherwise monitor a period of time after the disengagement of autopilot control. If no additional movement of helm 208 is detected over this time period, then CCU 206 may re-engage autopilot control of rudder 216. In variations of these additional embodiments, chart plotter 202, receiving unit 217, and/or sensor unit 218.1-218.3 may determine whether auto-pilot should be re-engaged and transmit an autopilot resume command to CCU 206, causing CCU 206 to resume autonomous steering of rudder 216.

Whether movement of the helm is detected during the measured period of time may be determined using a different predetermined autopilot re-engagement threshold or the same predetermined autopilot disengagement threshold used to determine whether sufficient helm movement previously occurred that caused autopilot 204 to be disengaged. For example, a predetermined autopilot disengaging threshold of 15 degrees may be selected such that, when the helm movement data (or a combination of helm movement data and marine vessel movement data) indicate that the helm has rotated (moved) in excess of 15 degrees, autopilot control of rudder 216 is disengaged. Alternatively, the predetermined autopilot re-engagement threshold may be a heading deviating less than 15 degrees or within 10 degrees/second and the threshold time period may be 60 seconds.

Autopilot 204 may be re-engaged once CCU 206 determines that the current heading of the marine vessel is within a predetermined autopilot re-engagement threshold over a threshold time period. Once the CCU 206 causes autopilot 204 to resume control, autopilot 204 may maintain the current (stabilized) heading of the marine vessel or remain on a course (route) to a destination. In embodiments, the heading of the marine vessel is stabilized (e.g., a heading deviating less than a predetermined autopilot re-engagement threshold of 15 degrees) or that the position of helm 208 has returned to its original position (before helm 208 was rotated). For instance, a current heading of the marine vessel within 5 degrees of its original heading may be determined to be acceptable to establish that the heading of the marine vessel is stabilized and cause autopilot 204 to be re-engaged. Similarly, a current rotational position of the helm 208 within 10 degrees of its original position may be used to cause autopilot 204 to be re-engaged. In this way, CCU 206 may disengage and re-engage autopilot 204 according to different heading and/or helm movement thresholds in a hysteretic manner, allowing for smooth transitioning between these two states. Once the CCU 206 causes autopilot 204 to resume control, autopilot 204 may maintain the current (stabilized) heading of the marine vessel or remain on a course (route) to a destination.

To provide another example, embodiments include CCU 206 re-engaging auto-pilot control of rudder 216 after the expiration of a period of time referenced to when autopilot control was initially disengaged. In other words, CCU 206 may disengage autopilot control of rudder 216, start a time, and then re-engage autopilot control upon expiration of the timer (e.g., 30 seconds, 60 seconds, 90 seconds, etc.). In accordance with such embodiments, CCU 206 may not need to monitor helm movement after autopilot 204 is disengaged, but may do so after re-engaging autopilot 204. In this way, helm movement may be monitored only when autopilot control is active and not otherwise monitored. Of course, embodiments also include chart plotter 202, receiving unit 217, and/or any one of sensor units 218.1-218.3 performing these functions. Specifically, chart plotter 202, receiving unit 217, and/or any one of sensor units 218.1-218.3 may determine if a particular time period has expired since autopilot control was disengaged. If so, any of these components may transmit an autopilot resume command to CCU 206 to cause CCU 206 to re-engage autopilot 204, thus resuming autonomous steering of rudder 216.

Figure 3:
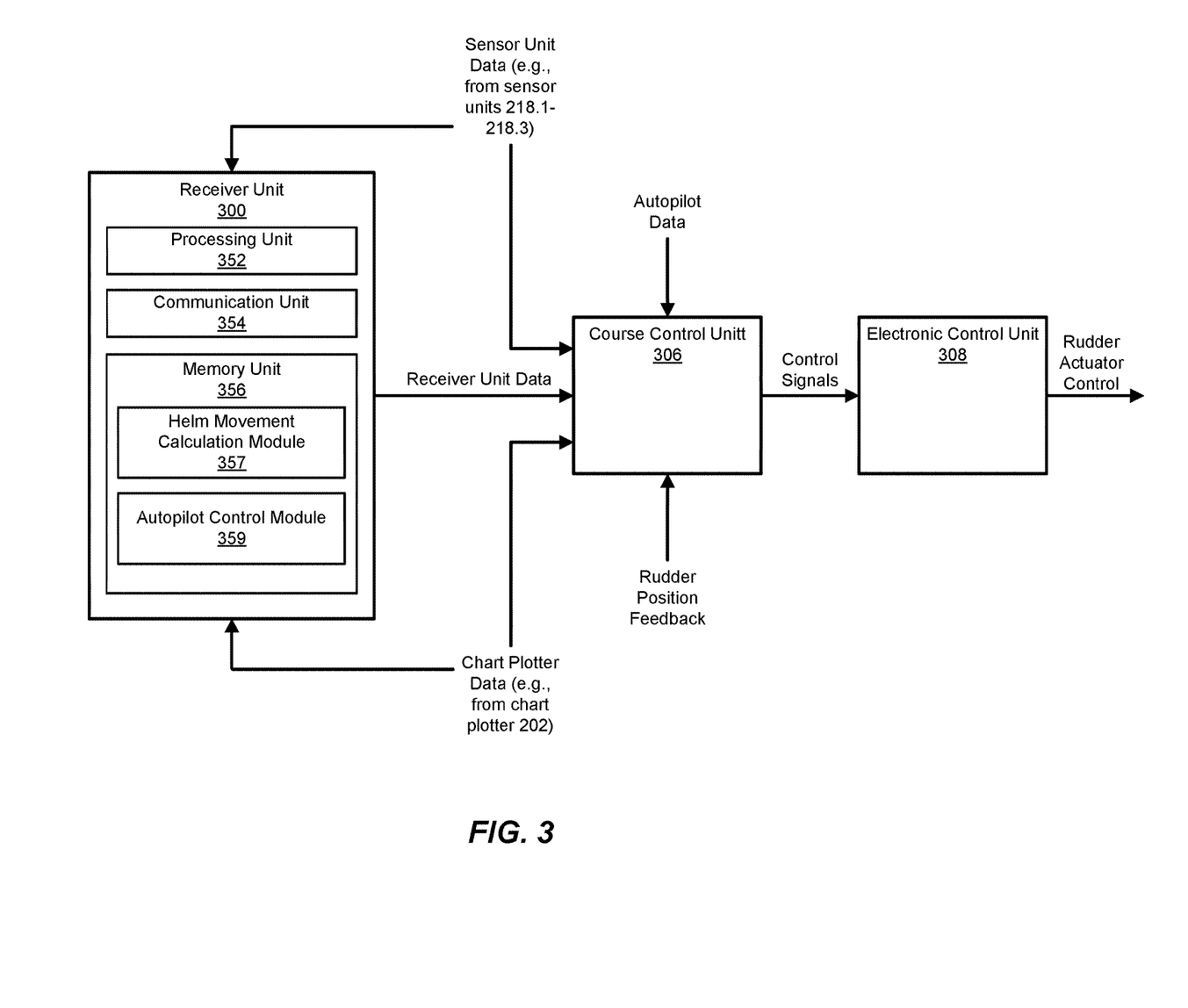
FIG. 3 is a block diagram example illustrating a receiver unit 300 and data communications associated with autopilot control, according to an embodiment.

FIG. 3 is a block diagram example illustrating a receiver unit 300 and data communications associated with autopilot control, according to an embodiment. FIG. 3 illustrates a receiver unit 300, a course control unit (CCU) 306, and an electronic control unit (ECU) 308. In an embodiment, receiver unit 300, CCU 306, and ECU 308 may be implementations of receiver unit 217, CCU 206, and ECU 208, as shown and discussed above with reference to FIG. 2.

Although receiver unit 300 is illustrated in FIG. 3 as providing data separately from the sensor unit data and the chart plotter data, embodiments include receiver unit 300 and/or any functionality described herein with respect to receiver unit 300 being incorporated by one or more other components of the autopilot system described herein. For example, receiver unit 300 may be incorporated as part a sensor unit (e.g., sensor unit 218.2), a chart plotter (e.g., chart plotter 202), an autopilot (e.g., autopilot 204), etc.

As shown in FIG. 3, receiver unit 300 may include a processing unit 352, a communication unit 354, and a memory unit 356. Processing unit 352 may be implemented as any suitable type and/or number of processors, such as a host processor of receiver unit 300, for example. To provide additional examples, processing unit 352 may be implemented as an application specific integrated circuit (ASIC), an embedded processor, a central processing unit associated with receiver unit 300, etc. Processing unit 352 may be coupled with and/or otherwise configured to communicate, control, operate in conjunction with, and/or affect operation of communication unit 354 and/or memory unit 356 via one or more wired and/or wireless interconnections, such as any suitable number of data and/or address buses, for example. These interconnections are not shown in FIG. 3 for purposes of brevity.

For example, processing unit 352 may be configured to retrieve, process, and/or analyze data stored in memory unit 356, to store data to memory unit 356, to replace data stored in memory unit 356, to analyze helm movement data and/or marine vessel movement data received from sensor units (e.g., sensor units 218.1-218.3), to process helm movement data and marine vessel movement data, to control various functions of receiver unit 300, etc. Additional details associated with such functions are further discussed below.

Communication unit 354 may be configured to support any suitable number and/or type of communication protocols to facilitate communications between receiver unit 300 and one or more other components of the autopilot steering system described herein such as a sensor unit (e.g., sensor unit 218.2), a chart plotter (e.g., chart plotter 202), an autopilot (e.g., autopilot 204), etc. Communication unit 354 may be configured to facilitate the exchange of any suitable type of information between receiver unit 300 and other components of the autopilot steering system described herein (e.g., via wired links such as network 201 or wireless links), and may be implemented with any suitable combination of hardware and/or software to facilitate such functionality. For example, communication unit 354 may be implemented with any number of wired and/or wireless transceivers, ports, connectors, antennas, etc. To provide an illustrative example, communication unit 354 may enable receiver unit 300 to communicate with CCU 306, to receive sensor data from one or more sensor units, to receive chart plotter data from one or more chart plotters, etc.

In accordance with various embodiments, memory unit 356 may be a computer-readable non-transitory storage device that may include any suitable combination of volatile (e.g., a random access memory (RAM), or non-volatile memory (e.g., battery-backed RAM, FLASH, etc.). Memory unit 356 may be configured to store instructions executable on processing unit 352. These instructions may include machine readable instructions that, when executed by processing unit 352, cause processing unit 352 to perform various acts as described herein. Memory unit 356 may also be configured to store any other suitable data used in conjunction with receiver unit 300, such as helm movement data, marine vessel movement data, disengaging thresholds, re-engaging thresholds, etc.

Helm movement calculation module 357 is a region of memory unit 356 configured to store instructions, that when executed by processing unit 352, cause processing unit 352 to perform various acts in accordance with applicable embodiments as described herein. In an embodiment, helm movement calculation module 357 includes instructions that, when executed by processing unit 352, cause processing unit 352 to calculate helm movement. This may include, for example, processing helm movement data (or a combination of helm movement data and marine vessel movement data) to calculate a change in the helm steering angle due to manual helm steering. Again, this determination may be made in accordance with the type of sensors and/or the number of sensors that are part of the autopilot steering system described herein. This may include the aforementioned techniques such as analyzing changes in the orientation of an accelerometer due to helm steering, analyzing changes in a magnetometer's measured magnetic field, analyzing the rate of angular movement of the helm accumulated over a period of time in the same direction measured by a gyroscope-based sensor, etc.

Autopilot control module 359 is a region of memory unit 356 configured to store instructions, that when executed by processing unit 352, cause processing unit 352 to perform various acts in accordance with applicable embodiments as described herein. In an embodiment, autopilot control module 359 includes instructions that, when executed by processing unit 352, cause processing unit 352 to generate one or more control commands and cause these control commands to be transmitted to CCU 306. Again, upon receiving these control commands, CCU 306 is configured to disengage and re-engage autonomous steering of rudder 216 by either actively transmitting control signals to ECU 308 (when autopilot is engaged or re-engaged) or pausing or stopping the transmission of control signals to ECU 308.

Therefore, autopilot control module 359 may include instructions that, when executed by processing unit 352, cause processing unit 352 to compare the calculated helm movement (e.g., a steering angle) to a predetermined autopilot disengagement threshold angle. If the helm steering angle exceeds the predetermined autopilot disengagement threshold angle, then receiver unit 300 may transmit a helm steering indicator or other suitable autopilot disengaging command to CCU 306. Furthermore, autopilot control module 359 may include instructions that, when executed by processing unit 352, cause processing unit 352 to start a timer and/or to compare subsequent helm movement (i.e., after the autopilot is disengaged) to a re-engaging helm threshold angle, as discussed above with reference to FIG. 2. If the helm steering angle is less than the predetermined autopilot re-engagement threshold angle, then receiver unit 300 may transmit an autopilot resume command or other suitable autopilot re-engaging command to CCU 306.

The arrows shown in FIG. 3 address one example in which data is transmitted between components, and thus illustrates data flow between various components with single directional arrows. However, it will be understood that the component associated with each respective data source may also communicate bidirectionally with other components. For example, receiver unit 300 may transmit and receive data from sensor units 218.1-218.3, CCU 306, and/or chart plotter 202. Furthermore, and as discussed above with reference to FIG. 2, receiver unit 300, chart plotter 202, and one or more of sensor units 218.1-218.3 may have varying levels of functionality regarding the processing of helm movement data (or a combination of helm movement data and marine vessel movement data) and acting upon this data. Therefore, FIG. 3 illustrates several data flow possibilities within the scope of various embodiments presented herein, which were also discussed above with reference to FIG. 2.

For example, the "sensor unit data" shown in FIG. 3 may include data transmitted by or more sensor units 218.1-218.3, such as helm movement data, marine vessel movement data, helm steering indicators, and/or autopilot resume indicators. Any portion of this data may be received by CCU 306, where it is processed to selectively disengage and re-engage autonomous steering of rudder 216. However, any portion of this data may alternatively or additionally be received by receiver unit 300, which may relay this data to CCU 306. Alternatively, receiver unit 300 may process the data and transmit suitable autopilot disengaging and re-engaging commands to CCU 306. In other words, the "receiver unit data" shown in FIG. 3 may include the data received from any of sensor units 218.1-218.3, the data received from chart plotter 202, as well as commands to cause CCU 306 to disengage and re-engage autopilot control. In this way, CCU 306 or receiver 300 may independently analyze data received from sensor units 218.1-218.3 otter 202 to determine when autopilot control should be disengaged and re-engaged.

To provide another example, chart plotter 202 may also relay any portion of data received from one or more sensor units 218.1-218.3 to receiver unit 300 and/or to CCU 306, and receiver unit 300 and/or CCU 306 may independently analyze the data (or receiver unit 300 may relay the data) as discussed above. Furthermore, chart plotter 202 may also independently process data received from one or more sensor units 218.1-218.3 to determine whether the movement of the helm exceeds a predetermined autopilot disengagement threshold (or predetermined autopilot re-engagement threshold) and transmit suitable autopilot disengaging (and re-engaging) commands to CCU 306. Therefore, the "chart plotter" data may include any portion of the sensor unit data as discussed above as well as data generated by chart plotter 202, such as commands to cause CCU 306 to disengage and re-engage autopilot control and routing data indicating a directional vector for the current leg of a charted route.

Figure 4:
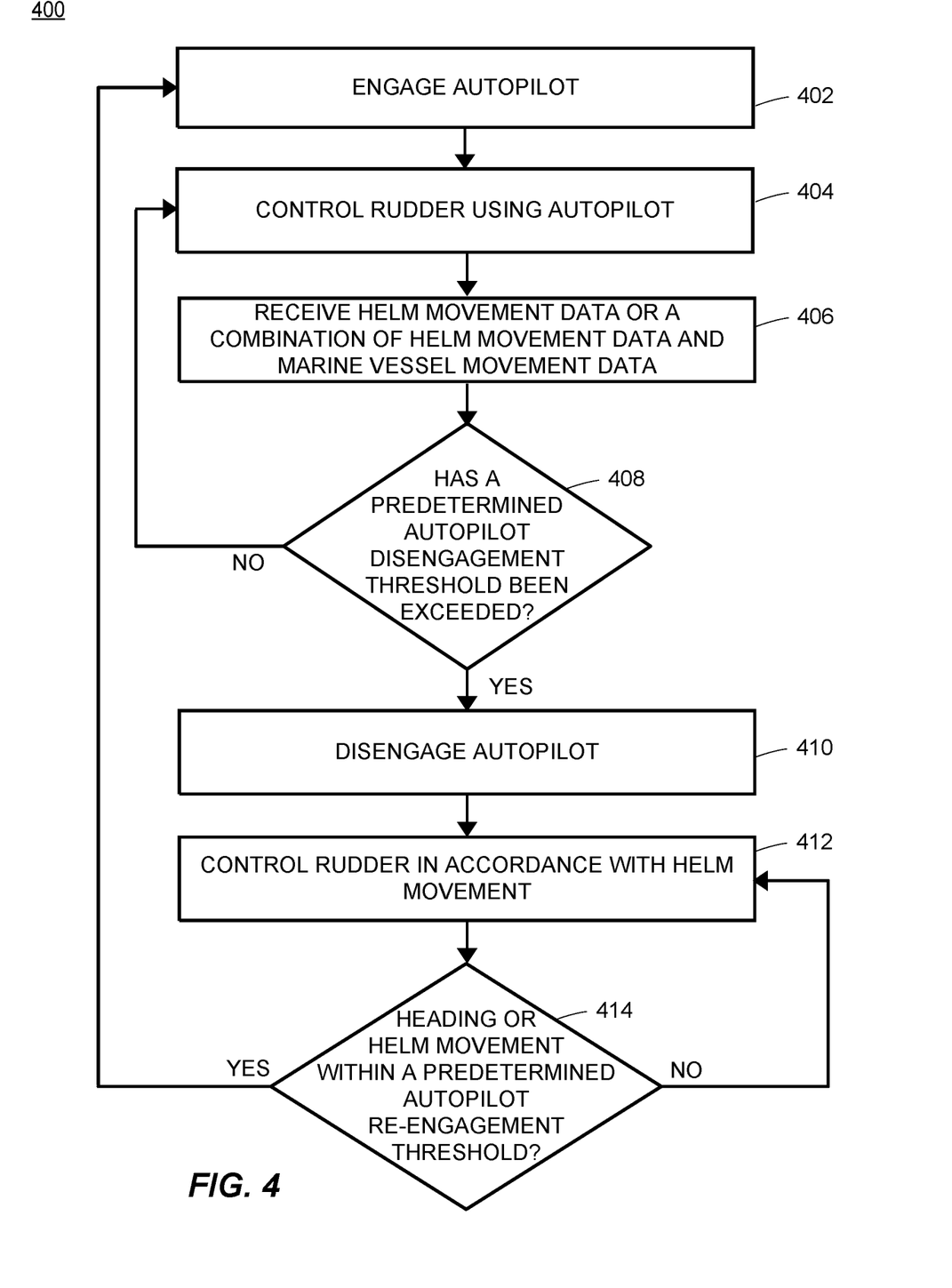
FIG. 4 illustrates a method flow 400, according to an embodiment.

FIG. 4 illustrates a method flow 400, according to an embodiment. In the embodiment, one or more regions of method 400 (or the entire method 400) may be implemented by any suitable device. For example, one or more regions of method 400 may be performed by course control unit (CCU) 206, as shown in FIG. 2 or CCU 306, as shown in FIG. 3.

Method 400 may begin when an autopilot system is engaged (block 402). This may include, for example, a user activating or engaging the autopilot via a chart plotter, which generates and transmits a command that is processed by the autopilot's CCU (block 402). This may also include, for example, the auto-pilot being re-engaged after being disengaged (block 402).

Method 400 may include controlling the marine vessel's rudder using the autopilot (block 404). This may be performed, for example, via a CCU first receiving routing data from the chart plotter, receiving autopilot data from one or more marine vessel components, and receiving rudder position feedback. Method 400 may include the CCU calculating adjustments to the rudder position in accordance with the routing data, the autopilot data, and the rudder position feedback. Method 400 may include the CCU generating control signals in accordance with the particular implementation of the rudder actuator used by the marine vessel and transmitting the control signals to an electronic control unit (ECU) to perform autonomous steering of the rudder (block 404).

Method 400 may include receiving helm movement data or a combination of helm movement data and marine vessel movement data (block 406). This may include, for example, a CCU receiving any portion of data transmitted by one or more sensor units such as data indicative of helm movement, data indicative of marine vessel movement, a rate of helm movement, an indication that movement of the helm exceeds a predetermined autopilot disengagement threshold, etc. (block 406).

Method 400 may include determining whether movement of the helm exceeds a predetermined autopilot disengagement threshold (block 408). This may include, for example, receiving a helm steering indicator from another marine vessel component, as discussed herein with reference to FIGS. 2 and 3 (block 408). This may also include, for example, analyzing the helm movement data or a combination of helm movement data and marine vessel movement data to determine whether the helm has been steered beyond a predetermined autopilot disengagement threshold helm angle (block 408). If so, method 400 may proceed to disengage the autopilot (block 410). If not, method 400 may revert back to continuing to control the rudder using the autopilot (block 404).

Method 400 may include disengaging the autopilot when movement of the helm exceeds a predetermined autopilot disengagement threshold (block 410). This may include, for example, the CCU stopping or pausing control signals being sent to the ECU (block 410).

Method 400 may include controlling the rudder in accordance with helm movement once the autopilot is disengaged (block 412). This may include, for example, processing or otherwise responding to helm movement in accordance with the marine vessel's helm control system (block 412). For instance, this may include controlling the rudder in accordance with a hydraulic actuator steering system or an electronic actuator steering system, as discussed herein (block 412).

Method 400 may include determining whether autopilot should resume (i.e., be re-engaged) (block 414). Method 400 may re-engage the autopilot when movement of the helm is less than a predetermined autopilot re-engagement threshold (block 414). This determination may be made, for example, via the CCU by receiving a re-engage autopilot command from another marine vessel component, as discussed herein with reference to FIGS. 2 and 3 (block 414). This may also include, for example, analyzing the helm movement data over a period of time or determining whether a period of time has elapsed since the autopilot was disengaged (block 414). If so, method 400 may proceed to re-engage the autopilot (block 402). If not, the method 400 may revert back to continuing to control the rudder using the helm movement (block 412). Once the CCU causes autopilot to resume control, the autopilot may maintain a current (stabilized) heading of the marine vessel or remain on a course (route) to a destination.

Some of the Figures described herein illustrate example block diagrams having one or more functional components. It will be understood that such block diagrams are for illustrative purposes and the devices described and shown may have additional, fewer, or alternate components than those illustrated. Additionally, in various embodiments, the components (as well as the functionality provided by the respective components) may be associated with or otherwise integrated as part of any suitable components. For example, any of the functionality described herein with reference to the electronic control unit may be performed by the autopilot.

It should be understood that, unless a term is expressly defined in this patent application using the sentence "As used herein, the term '___' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, numerous alternative embodiments may be implemented, using either current technology or technology developed after the filing date of this patent application.

Having thus described various embodiments of the technology, what is claimed as new and desired to be protected by Letters Patent includes the following:

What is claimed is:

1. An autopilot system for a marine vessel, comprising:
a memory configured to store a predetermined autopilot disengagement threshold and a predetermined autopilot re-engagement threshold;
a first sensor unit mountable to a helm of the marine vessel, the first sensor unit being configured to generate helm movement data and to wirelessly transmit the helm movement data;
a second sensor unit mountable to the marine vessel at a location different than the helm and configured to generate marine vessel movement data and to transmit the marine vessel movement data; and
a course control unit coupled to the memory, the first sensor unit, and the second sensor unit, the course control unit configured to:
receive the marine vessel movement data,
determine helm movement based upon a difference between the helm movement data and the marine vessel movement data,
determine a current heading of the marine vessel based on the marine vessel movement data,
disengage the autonomous steering of the rudder when the helm movement data exceeds the predetermined autopilot disengagement threshold, and
re-engage the autonomous steering of the rudder when the current heading of the marine vessel is within the predetermined autopilot re-engagement threshold.

2. The autopilot system of claim 1, wherein the rudder is associated with a hydraulic actuator steering system.

3. The autopilot system of claim 1, wherein the course control unit is further configured to autonomously steer the rudder to maintain the current heading of the marine vessel.

4. The autopilot system of claim 1, further comprising a network, wherein the course control unit is coupled to the second sensor unit through the network.

5. The autopilot system of claim 1, further comprising a housing containing the course control unit and the second sensor unit.

6. The autopilot system of claim 1, wherein the helm movement data is indicative of angular movement of the helm, and
wherein the predetermined autopilot disengagement threshold that causes the course control unit to disengage the autonomous steering of the rudder is a threshold helm angle.

7. The autopilot system of claim 1, wherein the helm movement data is indicative of a rate of angular movement of the helm, and
wherein the predetermined autopilot disengagement threshold that causes the course control unit to disengage the autonomous steering of the rudder is a threshold helm angle based upon the rate of angular movement of the helm accumulated in the same direction over a period of time.

8. The autopilot system of claim 1, wherein the second sensor unit is at least one of a gyroscope, accelerometer or a magnetometer, wherein the second sensor unit is further configured to determine and transmit at least one of a tilt angle, an acceleration and a magnetic heading of the marine vessel, and wherein the current heading of the marine vessel is determined based on the at least one of the determined tilt angle, the acceleration and the magnetic heading.

9. The autopilot system of claim 1, wherein the marine vessel movement data includes at least one of a roll of the marine vessel, a pitch of the marine vessel, and a yaw of the marine vessel.

10. An autopilot system for a marine vessel, comprising:
a memory configured to store a heading of the marine vessel, a predetermined autopilot disengagement threshold, and a predetermined autopilot re-engagement threshold;
a first sensor unit mountable to a helm of the marine vessel, the first sensor unit being configured to generate helm movement data and to wirelessly transmit a helm steering indicator when the helm movement data exceeds the predetermined autopilot disengagement threshold;
a second sensor unit mountable to the marine vessel at a location different than the helm and configured to generate marine vessel movement data and to transmit the marine vessel movement data; and
a course control unit coupled to the memory, the first sensor unit, and the second sensor unit, the course control unit configured to:
receive the helm steering indicator and the marine vessel movement data,
determine helm movement based upon a difference between the helm movement data and the marine vessel movement data,
determine a heading of the marine vessel based on the marine vessel movement data,
autonomously steer a rudder associated with the marine vessel to maintain a heading, the autonomous steering of the rudder disengaged in response to receiving the helm steering indicator, and
re-engage the autonomous steering of the rudder when the current heading of the marine vessel is within the predetermined autopilot re-engagement threshold.

11. The autopilot system of claim 10, wherein the rudder is associated with a hydraulic actuator steering system.

12. The autopilot system of claim 10, wherein the first sensor unit is further configured to determine and transmit a tilt angle, acceleration and magnetic heading of the marine vessel.

13. The autopilot system of claim 10, wherein the second sensor unit is further configured to determine and transmit at least one of a tilt angle, an acceleration and a magnetic heading of the marine vessel, and wherein the current heading of the marine vessel is determined based on the at least one of the determined tilt angle, the acceleration and the magnetic heading.

14. The autopilot system of claim 10, wherein the predetermined autopilot disengagement threshold is a helm angle, wherein the first sensor unit includes an accelerometer sensor and is further configured to determine the helm movement based upon changes in accelerometer sensor orientation as the helm is rotated when steered, and wherein the helm steering indicator is generated when helm movement data exceeds the helm angle.

15. The autopilot system of claim 10, wherein the predetermined autopilot disengagement threshold is a helm angle, wherein the first sensor unit includes a gyroscope sensor and is further configured to determine the helm movement based upon a rate of helm movement due to changes in an orientation of the gyroscope sensor as the helm is rotated when steered, and wherein the helm steering indicator is generated when helm movement data exceeds the helm angle based upon the rate of helm movement.

16. The autopilot system of claim 10, wherein the course control unit is further configured to wirelessly transmit an autopilot re-engage indicator when the current heading of the marine vessel is determined to be within a predetermined autopilot re-engagement threshold over a threshold time period.

17. The autopilot system of claim 10, wherein the second sensor unit is at least one of a gyroscope, an accelerometer or a magnetometer, and wherein the marine vessel movement data includes at least one of a roll of the marine vessel, a pitch of the marine vessel, and a yaw of the marine vessel.

18. An autopilot system for a marine vessel, comprising:
a memory configured to store a heading of the marine vessel, a predetermined autopilot disengagement threshold, and a predetermined autopilot re-engagement threshold;
a first sensor unit mountable to a helm of the marine vessel, the first sensor unit being configured to generate helm movement data and to transmit the helm movement data;
a second sensor unit mountable to the marine vessel at a location different than the helm and configured to generate marine vessel movement data and to transmit the marine vessel movement data; and
a course control unit coupled to the memory, the position determining component, the first sensor unit, and the second sensor unit, the course control unit configured to:
receive the marine vessel movement data,
determine helm movement based upon a difference between the helm movement data and the marine vessel movement data,
continuously determine a heading of the marine vessel based on the marine vessel movement data,
disengage the autonomous steering of the rudder when the helm movement data exceeds the predetermined autopilot disengagement threshold,
re-engage the autonomous steering of the rudder when the current heading of the marine vessel is within the predetermined autopilot re-engagement threshold, and
autonomously steer the rudder to maintain the current heading of the marine vessel.

19. The autopilot system of claim 18, wherein the second sensor unit is further configured to determine and transmit at least one of a tilt angle, an acceleration and a magnetic heading of the marine vessel, and wherein the current heading of the marine vessel is determined based on the at least one of the determined tilt angle, the acceleration and the magnetic heading.

20. The autopilot system of claim 18, wherein the second sensor unit is at least one of a gyroscope, an accelerometer or a magnetometer, and wherein the marine vessel movement data includes at least one of a roll of the marine vessel, a pitch of the marine vessel, and a yaw of the marine vessel.

* * * * *